United States Patent
Lee et al.

(10) Patent No.: US 8,403,105 B2
(45) Date of Patent: Mar. 26, 2013

(54) ESTIMATING A SOUND SOURCE LOCATION USING PARTICLE FILTERING

(75) Inventors: Wei Pien Lee, Eindhoven (NL); Bahaa Eddine Sarroukh, Eindhoven (NL); Leon C. A. Van Stuivenberg, Eindhoven (NL); Cornelis Pieter Janse, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/133,839

(22) PCT Filed: Dec. 11, 2009

(86) PCT No.: PCT/IB2009/055678
§ 371 (c)(1),
(2), (4) Date: Jun. 9, 2011

(87) PCT Pub. No.: WO2010/070556
PCT Pub. Date: Jun. 24, 2010

(65) Prior Publication Data
US 2011/0232989 A1      Sep. 29, 2011

(30) Foreign Application Priority Data
Dec. 16, 2008    (EP) .................................... 08171826

(51) Int. Cl.
*G01S 3/80* (2006.01)
*G06F 17/18* (2006.01)
(52) U.S. Cl. ...................................... 181/125; 702/179
(58) Field of Classification Search ................. 702/179; 181/125
See application file for complete search history.

(56) References Cited

U.S. PATENT DOCUMENTS

| | | | |
|---|---|---|---|
| 7,249,001 B2 * | 7/2007 | Heliot et al. | 702/189 |
| 7,542,825 B2 * | 6/2009 | Kawasaki | 701/1 |
| 7,773,771 B2 * | 8/2010 | Rao et al. | 382/103 |
| 2004/0220769 A1 * | 11/2004 | Rui et al. | 702/179 |
| 2006/0245601 A1 | 11/2006 | Michaud et al. | |
| 2008/0181430 A1 | 7/2008 | Zhang et al. | |

FOREIGN PATENT DOCUMENTS

WO    2008039217 A1    4/2008

OTHER PUBLICATIONS

Djuric et al: "Particle Filtering"; IEEE Signal Processing Magazine, Sep. 2003, pp. 19-39.
Crassidis et al: "Generalized Multiple-Model Adaptive Estimation Using an Autocorrelation Approach"; IEEE 9th International Conference on Information Fusion, 2006, 8 page Document.
Zhou et al: "Audiovisual Tracking Using Stac Sensors"; First ACM/IEEE International Conference on Distributed Smart Cameras, 2007, ICDSC'07, Sep. 2007, pp. 170-177.

(Continued)

*Primary Examiner* — Forrest M Phillips (57) ABSTRACT

A sound source location is estimated by particle filtering where a set of particles represents a probability density function for a state variable comprising the sound source location. The method includes determining the weight for a particle in response to a correlation between estimated acoustic transfer functions from the sound source to at least two sound recording positions. A weight update function may specifically be determined deterministically from the correlation and thus the correlation may be used as a pseudo-likelihood function for the measurement function of the particle filtering. The acoustic transfer functions may be determined from an audio beamforming towards the sound source. The audio weight may be combined with a video weight to generate a multimodal particle filtering approach.

15 Claims, 6 Drawing Sheets

OTHER PUBLICATIONS

Huang et al: "Tracking the Small Object Through Clutter With Adaptive Particle Filter"; International Conference on Audio, Language and Image Processing, 2008, ICALIP 2008, pp. 357-362.

Liu et al: "Fusion Tracking in Color and Infrared Images Using Sequential Belief Propagation"; 2008 IEEE International Conference on Robotics and Automation, May 2008, pp. 2259-2264.

Ward et al: "Particle Filter Beamforming for Acoustic Source Localization in a Reverberant Environment"; IEEE International Conference on Acoustics, Speech, and Signal Processing (ICASSP), 2002, vol. 2, pp. II-1777-II-1780.

Lim et al: "Particle Filter Algorithm for Single Speaker Tracking With Audio-Video Data Confusion"; 16th IEEE International Conference on Robot & Human Interactive Communication, Aug. 2007, pp. 363-367.

Bregonzio et al: "Multi-Modal Particle Filtering Tracking Using Appearance, Motion and Audio Likelihoods"; IEEE International Conference on Image Processing, 2007, ICIP 2007, pp. V-33-V-36.

Perez et al: "Data Fusion for Visual Tracking With Particles"; Proceedings of the IEEE, vol. 92, No. 3, Mar. 2004, pp. 495-513.

Chen et al: "Real-Time Speaker Tracking Using Particle Filter Sensor Fusion"; Proceedings of the IEEE, vol. 92, No. 3, Mar. 2004, pp. 485-494.

Arulampalam et al: "A Tutorial on Particle Filters for Online Nonlinear/Non-Gaussian Bayesian Tracking"; IEEE Transactions on Signal Processing, vol. 50, No. 2, Feb. 2002, pp. 174-188.

Nummiaro et al: "An Adaptive Color-Based Particle Filter"; Image and Vision Computing, 2002, pp. 1-12.

Zotkin et al: "Joint Audio-Visual Tracking Using Particle Filters"; EURASIP Journal on Applied Processing, Nov. 2002, vol. 2002, No. 11, pp. 1154-1164.

Nickel et al: "An Audio-Visual Particle Filter for Speaker Tracking on the Clear'06 Evaluation Dataset"; 1st International Evaluation Workshop on Classification of Events, Activities and Relationships, Clear '06, LNCS 4122, pp. 69-80.

* cited by examiner

ESTIMATING A SOUND SOURCE LOCATION USING PARTICLE FILTERING

FIELD OF THE INVENTION

The invention relates to estimation of a sound source location using particle filtering and in particular, but not exclusively, for estimating a sound source location for a multi modal audio visual communication application.

BACKGROUND OF THE INVENTION

Detection of the position of a location of a sound source is important for many services and applications. For example, in an audiovisual teleconferencing application, improved performance can be achieved by detecting the position of the speaker for example by enhancing the speech signal through beamforming techniques, using the estimated speaker position to steer the beam. As another example the video may be enhanced, e.g. by zooming in on the estimated speaker position.).

Accordingly systems and algorithms for estimating a sound source location have been developed. Specifically, it has been proposed to use particle filtering techniques to estimate and track sound source positions. Particle filtering seeks to estimate the value of a state variable reflecting the current state of a system for consecutive time instants. For example, the particle filter may seek to estimate the value of a state variable representing a sound source position. However, rather than merely consider a single value or estimate, particle filtering considers a probability density for the state variable at each time instant. Particle filtering is based on a sequential approach wherein the state variable value for a given (sample) time instant is determined on the basis of the state variable value at the previous (sample) time instant. As the state variable at a time instant is represented by its probability density function (thus reflecting the uncertainty in the knowledge/estimation of the state variable value), this in principle involves determining the probability density function at the time instant from the probability density function of the previous time instant.

However, in many scenarios this is not analytically practical, feasible or even possible. For example, for non-linear systems with non-Gaussian noise, the calculation of the probability density function at a given time instant based on the probability density function at the previous time instant is not feasible. Particle filtering resolves this problem by representing the probability density function by a set of particles wherein each particle represents a possible value of the state variable. The probability density function at a given time instant is then determined by calculating an updated state variable value of each particle of the previous time instant based on a known state variable update function. The update of the particle may furthermore add noise in accordance with a suitable noise profile.

Furthermore, each particle has an associated weight which represents a likelihood measure for the particle. The weight of a particle is modified in the update from one time instant to the next based on a measurement of the system. Thus, it is assumed that a measurement value can be estimated or calculated from the state variable value (e.g. by a measurement function). This relationship may specifically include a noise contribution in accordance with a known (or assumed) noise profile. Accordingly, the weight of a particle may be modified as a function of the update. In particular, if the actual measurement made has a relatively high probability of resulting from the updated state variable value (as evaluated using the measurement function), the weight of the particle is increased relatively to the previous weight. Conversely, if the actual measurement made has a relatively low probability of resulting from the updated state variable value, the weight of the particle is reduced relatively to the previous weight.

Thus, as part of the particle update from one time instant to the next, the weight of the particles are modified to reflect how likely the given particle is to result in the new measurement. Thus, the weights are continuously updated to reflect the likelihood that the individual particle corresponds to the actual state value resulting in the measurement values.

Thus, in particle filtering each particle may be considered a discrete sample of the probability density function of the state variable.

The weights will typically converge towards the probability density function for the state variable. However, the particle filtering approach may often result in the weights degenerating such that a large number of weights end up having very small values whereas others have large values. In other words, the particle filtering may result in the information being concentrated in a relatively low proportion of the particles. In order to address this problem, resampling may be performed where new samples are generated that provide a more even distribution of sample particles. This approach corresponds to an importance sampling approach and will result in more particles being concentrated in areas for which the probability density function has a relatively high value and fewer particles being in areas wherein the probability density function has lower values.

As a specific example, resampling may be performed by calculating an average weight per particle and then generating a new set of particles with each particle being assigned this weight. However, this new set of particles will be distributed to reflect the previous weights of the particles. As a specific example each particle may be split into a number of particles with (approximately) the same state variable value with the number of new samples being given as the weight of the particle divided by the average weight. This will furthermore result in a large number of particles being deleted from the set of particles (and being replaced by duplicate particles for particles with above average weight).

Thus, at any given instant the probability density function for the state variable is represented by the particles and specifically is represented by a combination of the distribution of the particles (i.e. the importance sampling of their state variable values) and their weight.

A single estimate for the state variable value can then be determined by the summation of the particle values with each value being weighted by the particle weight. Thus, the state variable is estimated from integration (weighted summation) of the discrete sampled probability density function (with each sample corresponding to a particle).

More information on particle filtering can e.g. be found in M. Sanjeev Arulampalam, et. al., "A Tutorial on Particle Filters for Online Nonlinear/Non-Gaussian Bayesian Tracking", IEEE Transactions On Signal Processing, vol. 50, no. 2, February 2002.

However, a problem with particle filtering is that a sufficiently accurate update of the weights of the particles is critical for obtaining sufficiently reliable results. Indeed, for sound source location, the adaptation of the particle weights and distribution is heavily dependent on suitable measurements and measurement functions that accurately reflect the relationship between the state variable and the real sound source position. However, most currently applied measurement techniques and functions tend to result in suboptimal results.

Hence, improved sound source location estimation using particle filtering would be advantageous and in particular an approach allowing increased flexibility, reduced complexity, increased accuracy and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of estimating a sound source location for a sound source by particle filtering, the method comprising: iterating the step of generating a set of particles for a time instant, the set of particles representing a probability density function for a state variable comprising the sound source location at the time instant; the step comprising for each particle of the set of particles: generating a state value for the particle at the time instant in response to a state value of the particle at a previous time instant, and generating a weight for the particle at the time instant in response to a weight of the particle at the previous time instant and a measurement at the time instant; and generating a state variable estimate comprising a sound source location estimate for a first time instant in response to a combination of state values for the set of particles at the first time instant, the contribution from each particle of the set of particles depending on the weight of the particle; wherein the step of generating the weight for the particle at the time instant comprises determining the weight in response to a correlation between estimated acoustic transfer functions from the sound source to at least two sound recording positions for the first time instant.

The invention may provide improved estimation of a sound source location and may in particular allow an efficient and/or accurate particle filtering approach for estimating a sound source location. Furthermore, a practical and low complexity approach may be used. In particular, a low complexity and/or low resource demanding approach for estimating and incorporating acoustic data or measurements into a particle filtering based sound source location estimation can be achieved.

The state variable may specifically comprise one or more variables (such as e.g. a set of coordinates) representing the sound source location. The state variable may in some embodiments comprise other variables not representing the sound source location. The state variable may thus comprise a plurality of individual variables or parameters. The state value may comprise a plurality of individual parameters or variable values. E.g. the state value may be a vector of e.g. scalar or complex values.

The acoustic transfer functions may specifically be represented by their impulse responses.

In accordance with an optional feature of the invention, the step of generating the weight comprises: determining the weight for the particle in response to a value of the correlation for a delay corresponding to the state value of the particle.

This may provide improved and/or facilitated estimation of a sound source location based on particle filtering. In particular, the invention may allow improved weight updating for the particle filtering. The correlation may in particular provide a highly advantageous reflection of the impact of the measurement on the particle probability. Furthermore, the inventors have realized that the value of the correlation for a delay corresponding to the position represented by the state value may provide a reliable indication of the probability of the actual position of the sound source matching that of the position represented by the state value.

In accordance with an optional feature of the invention, the weight has a deterministic relationship to the value of the correlation.

This may provide improved and/or facilitated estimation of a sound source location based on particle filtering. In particular, the invention may allow improved weight updating for the particle filtering. The correlation may in particular provide a highly advantageous reflection of the impact of the measurement on the particle probability. Furthermore, the inventors have realized that the value of the correlation for a delay corresponding to the position represented by the state value may provide a reliable indication of the probability of the actual position of the sound source matching that of the position represented by the state value. In particular, the inventors have realized that the uncertainty and/or noise associated with the measurement function for weight updating may be represented by the variations of the correlation for different delays. Thus, the noise and/uncertainty may be represented by the correlation with no other noise or stochastic contribution being considered.

In accordance with an optional feature of the invention, the deterministic relationship is non-linear.

The feature may provide improved sound source location estimation and may in particular result in an improved representation of noise and uncertainty in the measurement process by the correlation. In particular, the approach may allow a closer representation of a probability density function for the measurement function by the correlation.

In accordance with an optional feature of the invention, the step of generating the weight comprises using the correlation as an indication of a pseudo likelihood function for a weight update function relating the weight for the particle at the time instant in response to the weight of the particle at the previous time instant.

This may provide improved and/or facilitated estimation of a sound source location based on particle filtering. In particular, the invention may allow improved weight updating for the particle filtering. The correlation may in particular provide a highly advantageous reflection of the impact of the measurement on the particle probability. Furthermore, the inventors have realized that the value of the correlation for a delay corresponding to the position represented by the state value may provide a reliable indication of the probability of the actual position of the sound source matching that of the position represented by the state value. In particular, the inventors have realized that the uncertainty and/or noise associated with the measurement function for weight updating may be represented by the variations of the correlation for different delays. Thus, the noise and/uncertainty may be represented by the correlation with no other noise or stochastic contribution being considered.

In accordance with an optional feature of the invention, the sound source position is represented by a two dimensional position in a two dimensional plane.

The invention may provide efficient and/or accurate sound source location in two dimensions which may be particularly suitable for many applications including for example combined audio and visual applications such as e.g. teleconferencing.

In accordance with an optional feature of the invention, the method further comprises: receiving at least one image from a camera covering an environment including the sound source; and wherein the two dimensional position is a position in the at least one image.

The invention may provide a particularly accurate integration of sound source location estimation and image applications such as a video application. In particular, the invention may provide a particularly advantageous combination of audio and visual processing and may allow e.g. an improved location of a sound source in a captured image.

The camera may be located to capture an area also covered by sound recording elements at the first and second sound recording positions. For example, the camera may be placed between two microphones at the sound recording positions.

In accordance with an optional feature of the invention, the step of generating the weight comprises generating a first weight contribution in response to an image domain measurement for the particle, and generating a second weight contribution in response to the correlation, and generating the weight as a combination of the first weight and the second weight.

The invention may provide a particularly advantageous approach to determine a location of a sound source based on a multi-modal particle filtering approach.

In accordance with an optional feature of the invention, the method further comprises: generating a confidence indication for the first weight contribution in response to the correlation; and adjusting the contribution of the first weight contribution in the combination relative to the second weight contribution in response to the confidence indication.

The invention may provide an improved estimation of a location of a sound source based on a multi-modal particle filtering approach, and may in particular provide an improved integration of the contributions from the audio domain and from the video/visual domain.

In accordance with an optional feature of the invention, the step of performing an audio beamforming towards the sound source position and estimating the transfer functions in response to the audio beamforming.

This may provide a particularly suitable way of estimating suitable acoustic transfer functions and may allow improved performance and/or reduced complexity.

In accordance with an optional feature of the invention, the step of generating the weight comprises determining the weight in response to a second correlation between estimated acoustic transfer functions from the sound source to one of the at least two sound recording positions and an estimated acoustic transfer functions from the sound source to another sound recording position for the first time instant; the another sound recording position being offset relative to a line between the at least two sound recording positions.

The feature may allow improved sound source location estimation and may in many embodiments allow an improved two-dimensional sound source location.

In accordance with an optional feature of the invention, the step of generating the weight comprises: receiving a first signal from a sound recording element at a first position of the at least two sound recording positions; receiving a second signal from a sound recording element at a second position of the at least two sound recording positions; and estimating the acoustic transfer functions in response to the first signal and the second signal.

The feature may allow improved sound source location estimation.

In accordance with an optional feature of the invention, the step of generating the weight comprises: filtering the first signal in a first adaptive filter to generate a first filtered signal; filtering the second signal in a second adaptive filter to generate a second filtered signal; summing the first and second filtered signal to generate a combined directional signal; and setting coefficients of the first adaptive filter and the second adaptive filter to generate the combined directional signal such that a power estimate for the sound source component of the combined directional signal is maximized; and estimating the acoustic transfer functions in response to the coefficients of the first adaptive filter and the second adaptive filter.

The feature may allow improved sound source location estimation and may in particular provide a particularly advantageous determination of a suitable correlation function. The approach may in particular allow a low complexity yet accurate determination of a suitable correlation function for determining weight updates for the particles.

In accordance with an optional feature of the invention, the step of generating the weight comprises: filtering the combined directional signal in a third adaptive filter to generate a third filtered signal, a transfer function of the third adaptive filter corresponding to a delay compensated substantially complex conjugated transfer function of the first adaptive filter; determining a difference signal between the first signal and the third filtered signal; and adapting the transfer function of the first adaptive filter to reduce the difference signal.

The feature may allow improved sound source location estimation and may in particular provide a particularly advantageous determination of a suitable correlation function. The approach may in particular allow a low complexity yet accurate determination of a suitable correlation function for determining weight updates for the particles.

According to an aspect of the invention there is provided an apparatus for estimating a sound source location for a sound source by particle filtering, the apparatus comprising: means for iterating the step of generating a set of particles for a time instant, the set of particles representing a probability density function for a state variable comprising the sound source location at the time instant; the step comprising for each particle of the set of particles: generating a state value for the particle at the time instant in response to a state value of the particle at a previous time instant, and generating a weight for the particle at the time instant in response to a weight of the particle at the previous time instant and a measurement at the time instant; and means for generating a state variable estimate comprising a sound source location estimate for a first time instant in response to a combination of state values for the set of particles at the first time instant; wherein the step of generating the weight for the particle at the time instant comprises determining the weight in response to a correlation between estimated acoustic transfer functions from the sound source to at least two sound recording positions for the first time instant.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a sound source location estimation for a teleconferencing system further receiving a video input. However, it will be appreciated that the invention is not limited to this application but may be applied to many other applications and systems.

Figure 1:
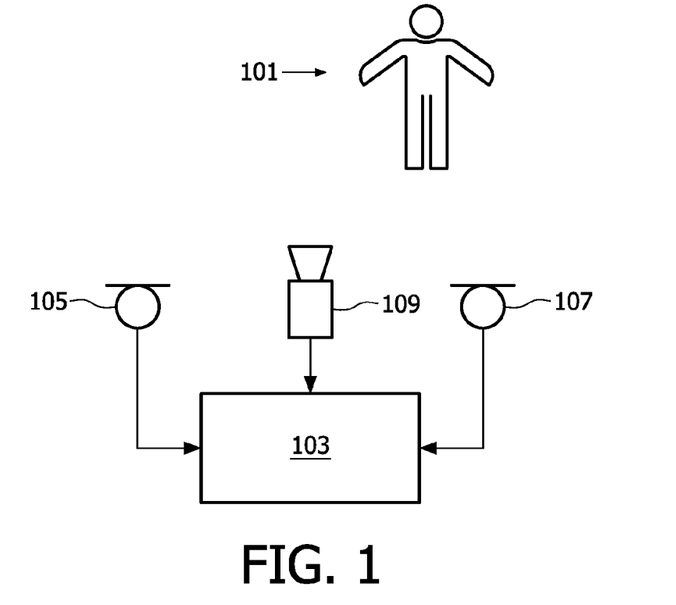
FIG. 1 is an illustration of an example of a teleconferencing system in accordance with some embodiments of the invention.

The following description will specifically focus on a teleconferencing system such as that shown in FIG. 1. FIG. 1 illustrates a scenario wherein a single user 101 participating in a teleconferencing session is captured by a teleconferencing apparatus 103 using both a pair of sound recording elements (in the form of microphones 105, 107) for capturing audio and a camera 109 for capturing video. The teleconferencing apparatus 103 is coupled to a communication system (not shown) thereby allowing the user to participate in a teleconferencing session with remote users. The teleconferencing application may specifically be a video teleconferencing application.

In the system, the teleconferencing apparatus 103 thus generates an audiovisual signal comprising both audio and video from the signals captured by the microphones 105, 107 and the camera 109. The audiovisual signal may then be communicated to remote users via the communication system (not shown).

In the example, the microphones 105, 107 are located at sound recording positions that are relatively close to each other. In many embodiments, the distance may advantageously be less than a tenth of the distance to the sound source (the speaker 101 in the present example) and/or may be less than 51 cm. This may in many scenarios allow the audio captured by the microphones to be considered to be from planar sound waves which may facilitate and/or improve the processing described in the following. In particular, it may facilitate and/or improve the sound source estimation.

In the example, the camera 109 is located between the two microphones 105, 107 and is specifically positioned substantially midway between the microphones 105, 107 and substantially on the axis defined by the two sound recording positions.

In the system, the teleconferencing apparatus 103 is arranged to estimate a sound source location which in the specific example is the location of the speaker 101. Thus, the teleconferencing apparatus 103 will seek to detect and track the location of the sound originating from the speaker. Furthermore, in the example, the location of the sound source is detected in a two dimensional plane, i.e. a two dimensional rather than three dimensional sound source location estimation is performed. In the example, the two-dimensional plane is a plane which may be considered to correspond to the plane defined by image taken by the camera 109.

Figure 2:
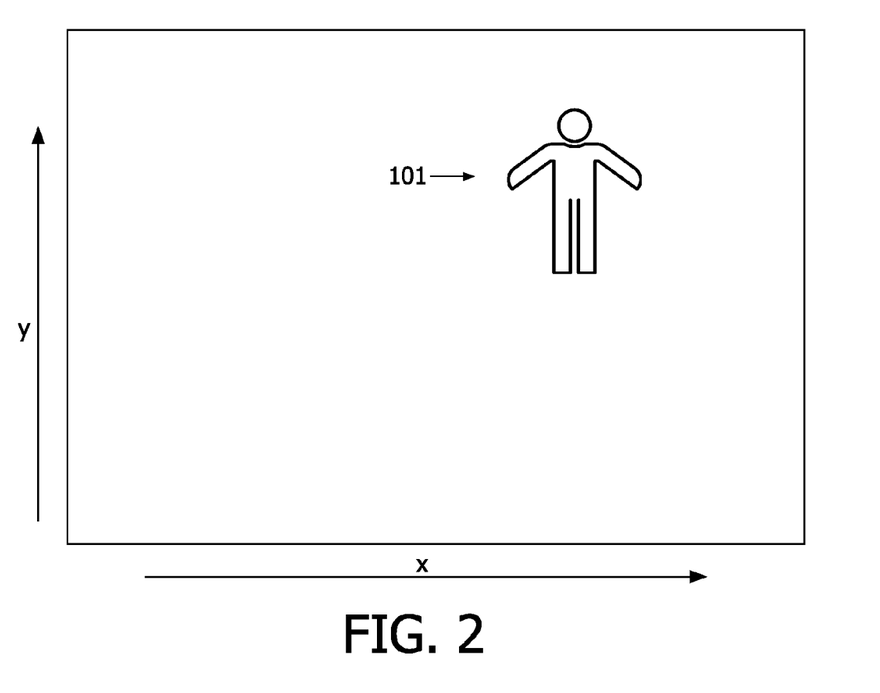
FIG. 2 is an illustration of an example of an image captured by the teleconferencing system illustrated in FIG. 1.

FIG. 2 illustrates an example of the image that may be captured by the camera 109. The image may for example be a single image/frame of a video signal. The position in the image of the sound source constituted by the speaker 101 may in this case be defined as an image position (x,y) where x represents the horizontal image position and y represents the vertical position.

The teleconferencing apparatus 103 of FIG. 1 seeks to determine the location in the image (i.e. the coordinates (x,y)) of the sound source/speaker 101. The estimated sound source location may then be used to optimize the operation of the teleconferencing apparatus 103 and may specifically be used to steer audio beamforms or to zoom in on the sound source (e.g. the speaker 101).

It will be appreciated that in other embodiments, other sound source locations may be estimated in accordance with the described principles and approaches. It will also be appreciated that the described approach may be used to determine sound source locations using other reference frameworks and in particular that other two-dimensional or three dimensional reference coordinate systems may be used. For example, a real spatial two-dimensional or three dimensional position may be determined in other examples.

Figure 3:
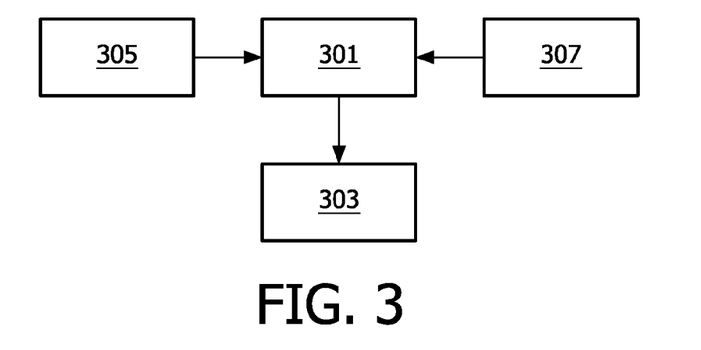
FIG. 3 is an illustration of an example of a teleconferencing apparatus in accordance with some embodiments of the invention.

The teleconferencing apparatus 103 specifically uses a particle filtering method for continuously estimating and tracking the position of the speaker 101 in the image. FIG. 3 illustrates elements of the teleconferencing apparatus 103 in more detail. Specifically, the teleconferencing apparatus 103 comprises a particle filter processor 301 which is arranged to execute a particle filter algorithm. The particle filter processor 301 is coupled to a position estimate processor 303 which is arranged to generate an estimate of the speaker position based on the particle data received from the particle filter processor 301.

The teleconferencing apparatus 103 furthermore comprises an audio processor 305 which receives the signals from the two microphones 105, 107 and which is coupled to the particle filter processor 301. The teleconferencing apparatus 103 also comprises a video processor 307 which receives the signal from the camera 109 and which is coupled to the particle filter processor 301. The particle filtering performed by the particle filter processor 301 is based on the audio measurements performed by the microphones 105, 107 and optionally on the video measurement performed by the camera 109.

Figure 4:
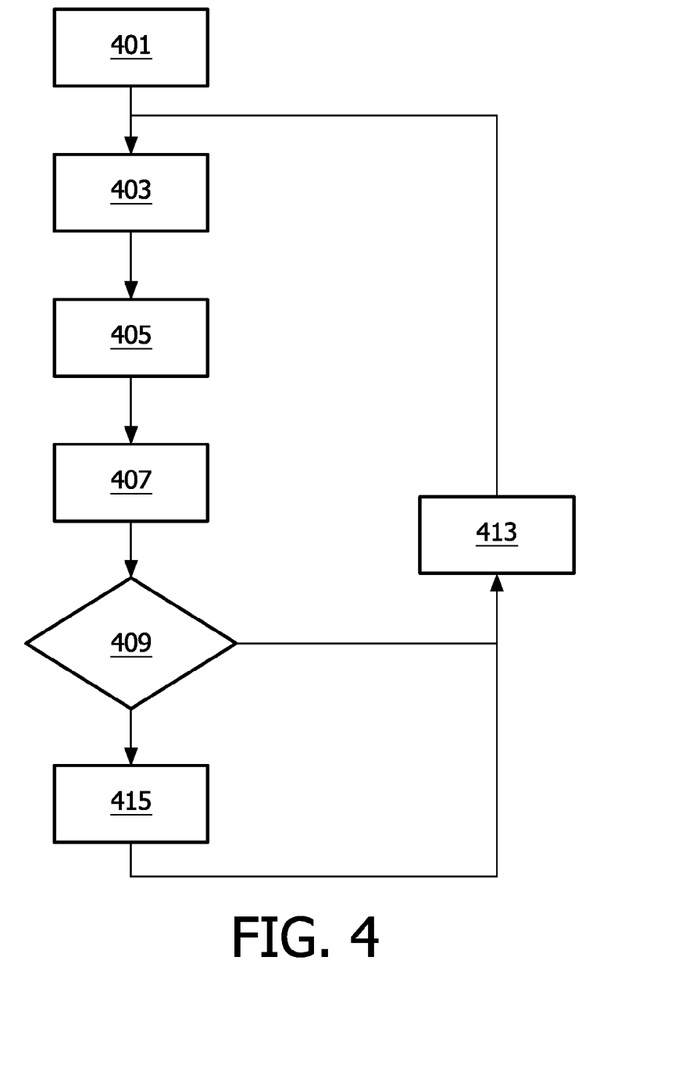
FIG. 4 is an illustration of an example of a method of sound source estimation in accordance with some embodiments of the invention.

FIG. 4 illustrates an example of a method of particle filtering to determine a sound source location. The method is specifically implemented by the teleconferencing apparatus 103 and used to estimate the image position of the speaker 101.

The method initiates in step 401 wherein the algorithm is initialized. Specifically, a set of particles is generated for a state variable. The state variable represents the underlying (correct) state of the system and in the specific example consists in the (correct) image position of the speaker (e.g. the (x,y) coordinate). However, rather than maintaining and tracking a single estimated value for the state variable (the position), the particle filtering approach maintains a number N of particles which represent a discrete representation of the probability distribution function for the state variable. Each particle has a state value representing the value of the state variable represented by the particle (in the specific case the state value corresponds to a specific position in the image). Furthermore, the particle has an associated weight which indicates the contribution the individual particle will make to the determination of a single estimate state value based on all particles. In particular, the state value (in the specific example the position in the image) is determined by a weighted summation of the state values of all particles. The probability density function is represented by the distribution of the particles (which due to resampling may be concentrated towards regions with high probability) together with the individual weight of each particle.

In step 401, the particle filter processor 301 initiates the particle filtering by drawing a set of N particles to represent the initial particles. The particles are drawn in accordance with a suitable distribution. For example, in some embodiments, the initial particles may be drawn based on a uniform distribution corresponding to no information being available about the actual probability distribution function for the state variable. In other embodiments, an estimated or expected distribution may be used. For example, in the specific example, it is likely that the speaker 101 will be located towards the center of the image and therefore the particles may be drawn in accordance with a distribution that has a higher probability towards the center of the image. Thus, a scattering of particle positions in the image may be generated with an increasing concentration or density towards the center of the screen. In the specific example, each particle is given the same initial nominal weight (It will be appreciated that in other embodiments, a non-uniform distribution may be partly or fully represented by varying weights).

Thus, in step 401, the particle filter processor 301 proceeds to generate an initial set of particles which represents the probability density function for a state variable that includes (or in the specific example consists of) the sound source location.

The particle filter processor 301 then proceeds to iteratively develop the particles by calculating the particle values and weights for a subsequent (sample) time instant based on the values at the previous (sample) time instant. Specifically, a state variable update function is assumed to be (at least approximately) known:

$$X_T = f(X_{T-1}, n_u)$$

where X represents the state variable, T represents the current (sample) time instant, T−1 represents the previous (sample) time instant and $n_u$ represents noise. In the specific example, it may be assumed that the speaker is not moving and thus the state variable update function may simply be considered as:

$$X_T = X_{T-1} + n_u$$

where n has a suitable distribution representing noise (e.g. corresponding to the uncertainty of the speakers 101 movements). The noise may specifically be non-Gaussian (e.g. it may represent an increased probability that the user will move towards the center of the image).

Thus, step 401 is followed by step 403 wherein each of the state values of each of the particles is determined depending on the state values at the previous time instant. Specifically, the particle filter processor 301 may apply the above equation to all particles to generate an updated set of particles at the current time instant T.

Step 403 is followed by step 405 wherein weights are updated for each of the particles generated in the updated set of particles. The weight of a particle is generated from the weight of the particle at the previous time instant plus a measurement reflecting the position of the speaker. Specifically, the weight of a particle is dependent on the likelihood that the measurement can result from a system wherein the state variable has the state value of the particle. Thus, the updated weight for a particle may be determined as:

$$w_T = g(w_{T-1}, X_T, X_{T-1}, n_m)$$

where $n_m$ represents noise and uncertainty associated with the measurement. It will be appreciated that in different embodiments and applications different measurement functions, g, may be used. However, in many scenarios it is appropriate to simply scale the weight of the previous time instant by the probability that the measurement could arise from the state variable:

$$w_T = w_{T-1} \cdot p(U_T | X_T)$$

where $U_T$ represents the measurement at time instant T.

In the system of FIG. 1, the updated weight for a particle is calculated as:

$$w_T = w_{T-1} \cdot q_T$$

where $q_T$ may provide a reasonable assumption of the probabilistic value $p(U_T | X_T)$. The approach will be described in detail later.

Following the application of the weights to the individual particles a normalization of the weights may be performed Step 405 is in the example followed by step 407 wherein a single estimated state value is calculated. Thus based on the particles which represent a discrete sampling of the probability density function for the state variable, a single estimated state variable value is calculated. Thus, the state values of the particles are combined to generate a single estimate with the contribution from each particle being dependent on the weight of the particle.

Specifically, a single image position for the speaker 101 is generated by the estimate processor 303 as a weighted summation of the image positions of the particles weighted by the weight of the particles. Thus, an average estimated position is determined by a discrete integration (summation) of the probability density function for the image position. This sound source location estimate may then be used to optimize the processing of the teleconferencing apparatus.

In particle filtering the particle distribution may in many cases tend to degenerate such that some particles have very high weight values whereas others reduce to very small weight values. Thus the distribution of the particles will often tend towards a distribution where many particles provide relatively little information of the underlying probability distribution function of the state variable.

Accordingly, the filtering algorithm used by the particle filter processor 301 comprises means for resampling the particles such that the distribution (and weights) of the particles is modified to provide a higher concentration of significant particles but without changing the underlying representation of the probability distribution function.

Thus, step 407 is followed by step 409 wherein it is determined whether resampling is necessary. If not, the method proceeds to step 413 wherein the system proceeds to select the next sample. The method then returns to step 403 and proceeds to iterate the particle filtering step for the next sample time instant. If resampling is necessary, the method proceeds to step 415 wherein resampling is performed before the method proceeds to steps 413 and 403 to iterate the filtering for the next sample time instant.

It will be appreciated that any suitable criterion for determining that resampling is necessary may be used without detracting from the invention. For example, resampling of the particles may be performed if the variance of the weights exceeds a given threshold.

It will also be appreciated that different approaches for resampling will be known to the skilled person and that any suitable method may be used without detracting from the invention.

For example, in some embodiments, a cumulative probability distribution function may be created from the probability distribution function represented by the particles. A suitable number N of particles may then be drawn by using the cumulative probability distribution function to convert from a uniform distribution to one that reflects the cumulative probability distribution function and thus the probability distribution function. Each of the resulting particles may then be given the same weight such that the set of particles immediately following the resampling represent the probability distribution function of the state variable by the distribution of the particles rather than by their weight.

As another example, the resampling may remove all particles below a given threshold and may divide particles with higher weight into a number of particles that reflect the weight. E.g. a particle having a high weight may be divided into M particles with the same (or very similar) state values and a weight equal to the previous weight divided by M.

In the method the weight for a particle at a time instant is determined in response to a correlation for the first time instant between estimated acoustic transfer functions from the sound source to at least the two sound recording positions represented by the two microphones 105, 107.

Figure 5:
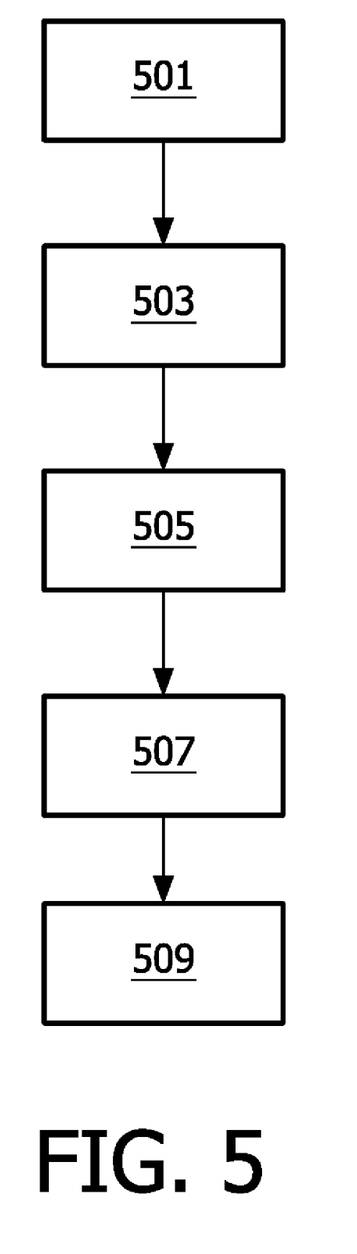
FIG. 5 is an illustration of an example of a method of determining weights in a sound source estimation in accordance with some embodiments of the invention.

Specifically, FIG. 5 illustrates step 405 in more detail. Step 405 initiates in step 501 wherein a first acoustic transfer function from the speaker 101 to the recording position of the first microphone 105 is determined.

In the example, the acoustic transfer function is estimated from the audio signal measured by the first microphone 105 and specifically the acoustic transfer function is estimated based on the speech signal from the speaker 101 which is captured by the first microphone 105. The transfer function is specifically represented by the impulse response of the acoustic path.

It will be appreciated that any suitable method of estimating the current acoustic transfer function may be used. For example, in some embodiments the speaker 101 may additionally speak into a microphone located at the speaker's mouth (e.g. mounted on a headset) and the acoustic transfer function may be estimated by a comparison of the audio signal recorded at this microphone and the audio signal recorded by the first microphone 105.

Step 501 is followed by step 503 wherein a second acoustic transfer function from the speaker to the recording position of the second microphone 107 is determined. The same approach as for the first acoustic transfer function may be used.

The two transfer functions accordingly represent the relative variations in the acoustic paths from the speaker 101 to the two microphones 105, 107. Specifically, each transfer function may contain information that reflects the relative delay, and thus path length, from the speaker 101 to each of the microphones 105,107. The acoustic transfer functions are thus dependent on the location of the speaker 101.

Step 503 is followed by step 505 wherein the correlation between the two acoustic transfer functions is determined. Specifically, the correlation function may be determined as:

$$c(\tau) = \sum_{t=-\infty}^{\infty} t_1(t) t_2^*(t+\tau)$$

Thus, the correlation function indicates how well the transfer functions match for a given relative delay offset. A given delay offset may correspond to a path length offset between the paths from the two microphones 105, 107 to the speaker 101. In the absence of any noise, reflections, estimation errors, quantization errors etc, the correlation function will correspond to a single Dirac pulse. However, in a real scenario, noise sources, reflections, estimation inaccuracies, interference, quantization etc results in a practical correlation function that is spread substantially. Thus, the inventors of the present invention have realized that the correlation value for a given delay may be perceived as an indication of a likelihood that the path difference between the paths from the two microphones 105, 107 to the (dominant) sound source corresponds to that relative delay difference. The inventors have furthermore realized that a weight update for a particle filtering update can be based on this perceived (pseudo) likelihood function.

Thus, in the system of FIG. 1 the correlation between the acoustic transfer functions is used to update the weight and specifically may be used to generate a value that can be considered to represent the probabilistic value $p(U_T|X_T)$. Thus, in the system, the acoustic transfer functions generated in response to the captured signals at the two recording positions (i.e. the two microphones 105, 107) may be used as the measurement for updating the weight, and specifically the correlation function may directly or indirectly be used as the pseudo likelihood function for the weight update function that relates the weight for a particle at a given time instant to the weight of the particle at the previous time instant.

Specifically, for a given position (x,y) in the image, the corresponding relative delay offsets between the path lengths from the two microphones 105, 107 can easily be determined using simple geometry (assuming the speaker is at a given distance). It will be appreciated that provided the distance between the two microphones 105, 107 is very small relative to the distance to the sound source, the sound wave reaching the microphones may be perceived as a substantially planar sound wave and the variation of the relatively delay dependent on the distance to the speaker 101 may be ignored. In other words, in many embodiments, the distance to the speaker can be ignored and a delay may be directly determined for a given image position. Thus, for a given variable value, i.e. for a given image position (x,y), a corresponding delay may be calculated. The (normalized) correlation value for this delay may then be obtained. The previous weight for the particle may then e.g. be directly scaled by an absolute value of this correlation value to generate the new updated weight. Thus, the update will reflect the likelihood that the measured correlation between the acoustic transfer functions matches the delay corresponding to that image position.

In the specific example of FIG. 5, step 505 is followed by step 507 wherein a weight measurement function is determined from the correlation. Specifically, in some embodiments, a scaling of the previous weight corresponding to the (optionally normalized) correlation function may be used directly as the measurement function.

However, in other embodiments, a deterministic (i.e. non-stochastic) function may be applied to the correlation function. For example, a non-linear operation may be applied to the correlation function. The non-linear function may specifically increase the variations in the correlation function and suitable non-linear functions may e.g. include:

$$m(\tau) = (c(\tau))^K$$

where K typically may be selected as 2, 3 or 4.

Such a non-linear relationship has been found to provide a measurement function which in many embodiments provides a more accurate approximation to a suitable measurement probability function and thus have been found to provide improved operation and sound source location estimation.

Figure 6:
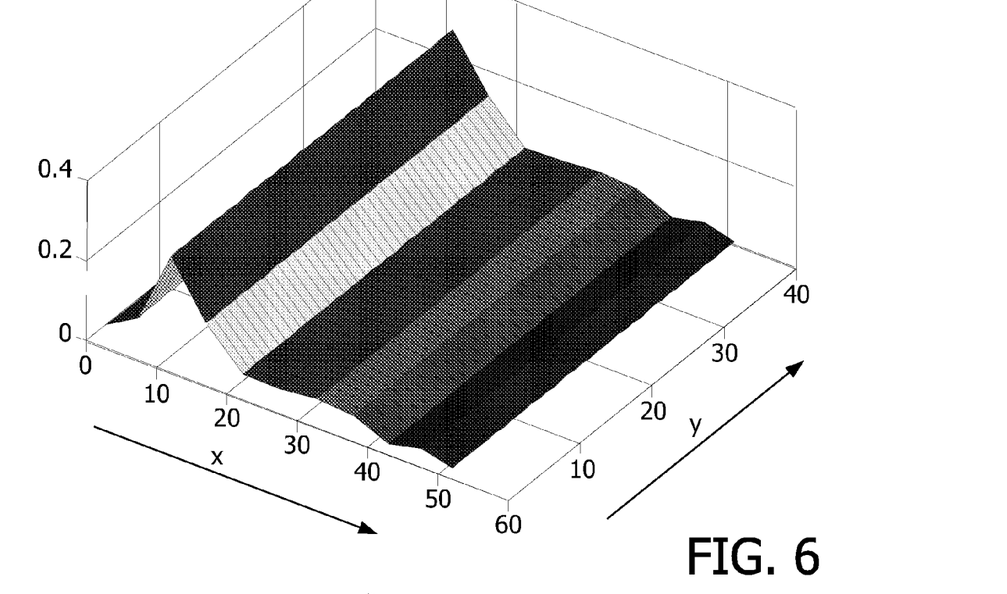
FIG. 6 is an illustration of an example of a weight update function for a sound source estimation in accordance with some embodiments of the invention.

FIG. 6 illustrates an example of a scaling value for a weight update function as a function of the display position. In the specific example, the scaling value corresponds to the correlation value for the delay corresponding to the image position.

Figure 7:
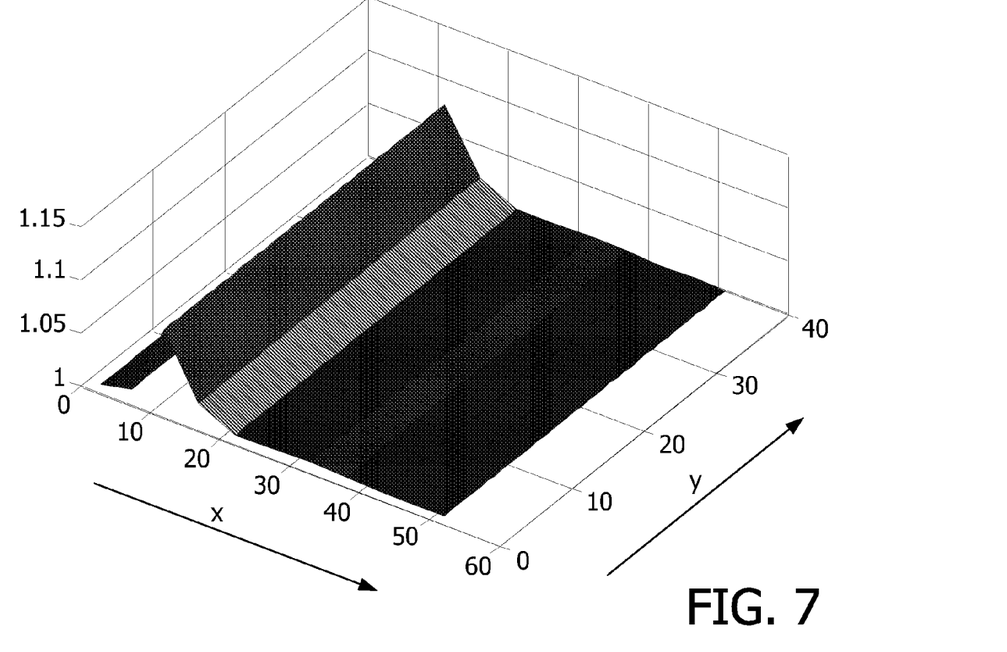
FIG. 7 is an illustration of an example of a weight update function for a sound source estimation in accordance with some embodiments of the invention.

FIG. 7 illustrates an example of a scaling value for a weight update function as a function of the display position corresponding to the example of FIG. 6 but after applying a non-linear operation.

Step 507 is followed by step 509 wherein the weight value is determined for the particle. Specifically, the new weight for a particle is determined from:

$$w_T = w_{T-1} \cdot q_T$$

where $q_t$ is the scaling of the measurement function determined for the delay corresponding to the image position (x,y) of the particle.

In the previously described example, a single correlation from two microphones 105, 107 was used. Furthermore, the axis of the microphones 105, 107 was assumed to be aligned with the X axis of the image and accordingly the relative delays between the corresponding transfer functions are (approximately) independent of the y position. Thus, as exemplified in FIGS. 6 and 7, the corresponding scaling factor is constant for different y positions since the correlation function is aligned with the x axis and constant for the y axis. In other words, the correlation function and accordingly the weight update function are one dimensional.

However, in other embodiments a third microphone may be included which may be located outside the axis of the first and second microphones 105, 107 (i.e. not in line with these). For example, a third microphone may be positioned on top of the camera. In this case, a second correlation function may be determined for the third microphone and e.g. the first microphone 105. The weight update function may then be determined deterministically from both correlation functions. Specifically, for a given image position the corresponding delay between the first and second microphones 105, 107 may be determined and the correlation value corresponding to this delay determined from the first correlation function may then be calculated. Secondly, for the given image position, the corresponding delay between the first and third microphones may be determined and the correlation value corresponding to this delay determined from the second correlation may be calculated. The scaling factor for a particle representing this position may then be determined by combining these two values (e.g. simply by multiplying them).

In the previous example, the weights were updated exclusively on the basis of an audio measurement (represented by the correlation). However, in other embodiments, the video input from the camera is also considered when updating the weight functions.

Figure 8:
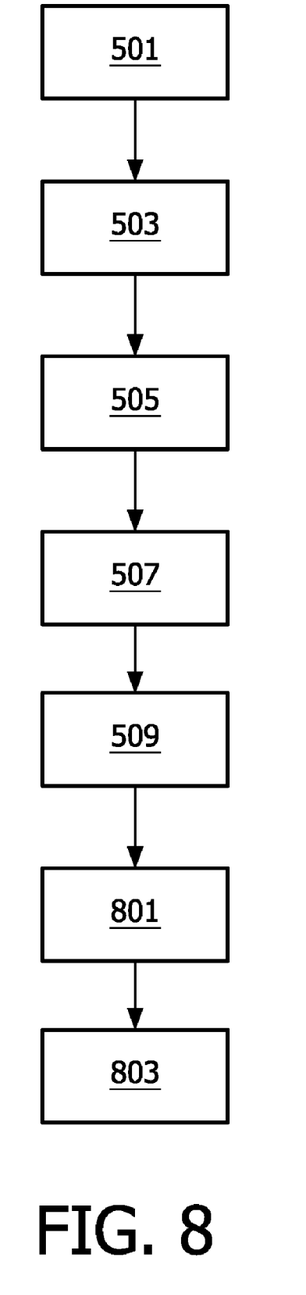
FIG. 8 is an illustration of an example of a method of determining weights in a sound source estimation in accordance with some embodiments of the invention.

FIG. 8 shows an example of step 405 for such an example. In the example, the weight update includes first performing the steps 501-509 of FIG. 5 in order to determine an audio weight as previously described.

However, in this example, step 509 is followed by step 801 wherein a video weight is calculated based on the image provided by the camera. Thus, in step 801 a second weight contribution is generated which reflects the likelihood that the given image position of the particle is likely to result in the image captured by the camera. Thus, the video weight is determined in response to an image domain measurement.

Step 801 is followed by step 803 wherein the audio weight and the video weight are combined into a single weight for the particle.

It will be appreciated that the determinations of the audio weight and the video weight may be performed in parallel.

In the example, the combination includes a relative weighting of the two weight contributions. Specifically, the weighting may reflect a confidence indication for the audio weight which is generated on the basis of the correlation value. For example, the more the correlation resembles a Dirac impulse, the higher the confidence may be considered to be (as the impact of uncertain or unknown effects such as interference, noise, and reflections are likely to be less significant). As another example, the duration of the impulse response (e.g. defined by a given threshold) may be used as a confidence indication or the variance of the correlation may be used. In the example, the weighting of the audio weight contribution will increase for an increased confidence value.

In some embodiments, a confidence value may also be determined for the video weight and the weighting of the two weight contributions may depend on the relative weight of the confidence indications.

In some scenarios a lower bound may be applied to one or both of the weights. For example, the combination of the weights may be calculated based on a multiplication of the two weight contributions and introducing e.g. an offset to the weights may ensure that resulting weight may be higher than zero even though one of the weight contributions is zero. As a specific example, the combined weight may be calculated as $$w_{combined} = (\text{confidence}_{audio} * w_{audio} + \text{offset}_{audio}) * (\text{confidence}_{video} * w_{video} + \text{offset}_{video})$$

It will be appreciated that any suitable method may be used to estimate the acoustic transfer functions.

It will be appreciated that any suitable approach for determining the weight based on the image domain measurement may be used. For example, a suitable method is described in Katja Nummiaro, Esther Koller-Meier, and Luc van Gool, "An Adaptive Color-Based Particle Filter", Tech. Rep., Katholieke Universiteit Leuven and Swiss Federal Institute of Technology, September 2002.

In this approach, an image patch is transformed to another representation in order to reduce the amount of information to be processed and/or increase reliability by extracting the essential information. An example of such a representation is a color-histogram. In this color-histogram space, each image patch is represented by a single point (histogram is a vector from origin to that point). This space allows quantitative comparison of a desired image patch (e.g. object to be tracked) with any other image patch based on their color descriptions by calculating the distance between the corresponding points in the color histogram space. Many distance metrics exist that can be used including a simple Euclidian distance. Another distance metric known as the Bhattacharyya distance is in particular convenient, since its normalized output can be used to calculate a normal distributed weight for the particle filter.

In many embodiments, the acoustic transfer functions may be estimated as part of an acoustic beamforming. Specifically, an acoustic beamforming approach may be used to direct an audio beam towards the speaker 101 (assumed to be the dominant sound source in the environment). The relative filtering or weighting of the individual microphone signals may then be used as an estimate for the acoustic transfer functions.

It will be appreciated that any suitable beamforming algorithm may be used. In the specific example, the acoustic transfer functions are determined by a beamforming approach illustrated by the beamformer of FIG. 9.

Figure 9:
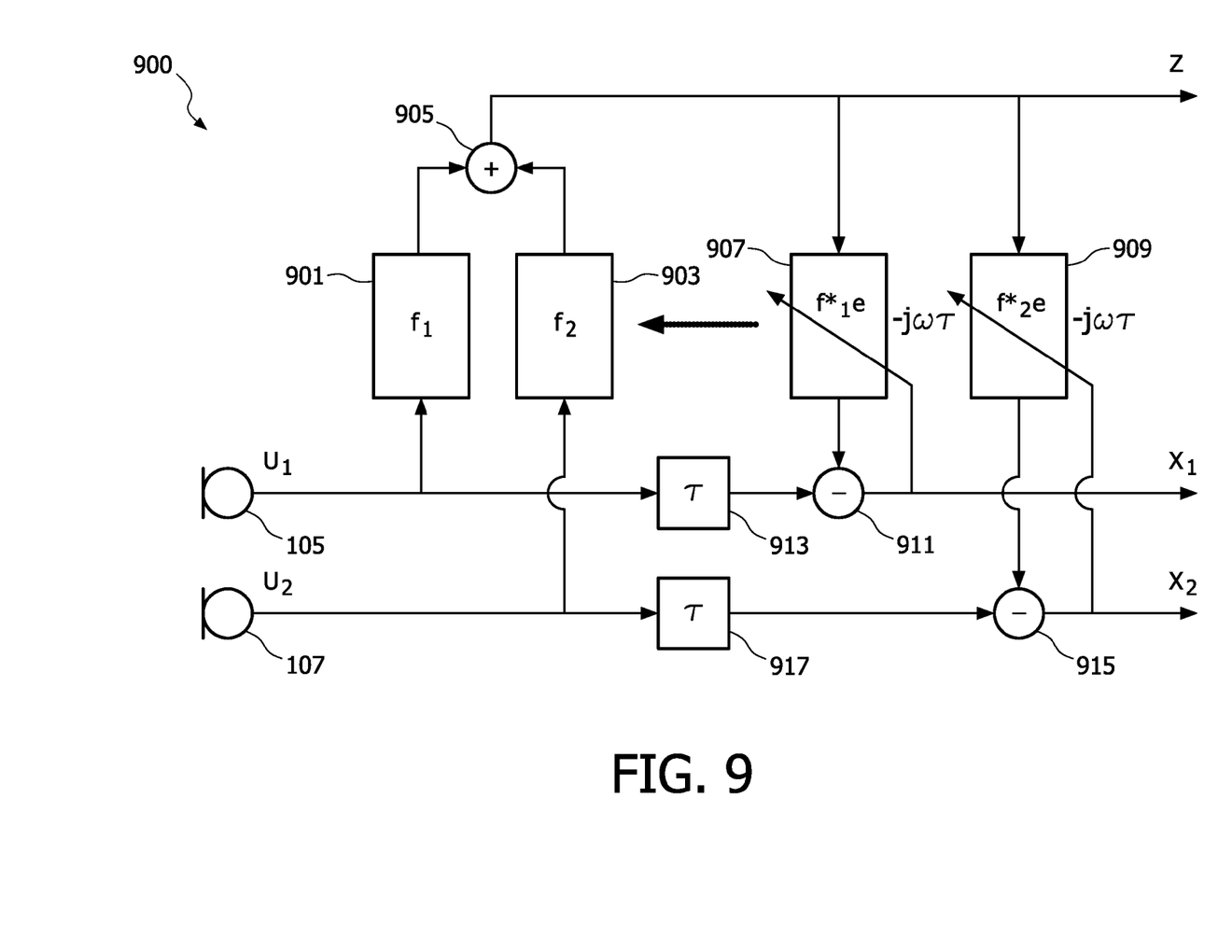
FIG. 9 is an illustration of an example of a teleconferencing apparatus in accordance with some embodiments of the invention.

The beam form unit 900 of FIG. 9 receives two input signals $u_1$, $u_2$ and processes these to generate an audio beamform. Conventionally, the input signals $u_1$, $u_2$ are received from omni-directional microphones 105, 107 but may also provided by (at least) two directional sound sensors.

In the beam forming unit 900, the first input signal $u_1$ is fed to a first adaptive filter 901 which generates a first filtered signal. The second input signal $u_2$ is fed to a second adaptive filter 903 which generates a second filtered signal. The first and second filtered signals are then summed in a summing unit 905 to generate a combined directional signal. The combined directional signal corresponds to a received audio signal from a sound sensor having a directional sensitivity. Specifically, by modifying the filter coefficients of the first and second adaptive filters 901, 903, the direction of an audio beam can be directed in a desired direction.

The filter coefficients are updated such that a power estimate for a desired sound source component of the combined directional signal is maximized. In the example, the filter coefficients are updated when a signal from a desired sound source (the speaker 101) is dominant and therefore the desired sound component is presumed to be the dominant source component of the combined directional signal. Accordingly, the filter coefficients are updated such that a power measure for the entire combined directional signal is maximized. A suitable power measure may for example be obtained by squaring (or taking the absolute value) of samples of the combined directional signal and filtering the result with a suitable low pass filter.

The adaptation of the filter coefficients are furthermore made with a constraint that the summed energy of the transfer functions of the adaptive filters 901, 903 is maintained constant at predefined frequencies.

In the specific example, the filter coefficients 901, 903 are not adapted directly. Instead, the beam forming unit 900 furthermore comprises a third adaptive filter 907 for filtering the combined directional signal to generate a third filtered signal and a fourth adaptive filter 909 for filtering the combined directional signal to generate a fourth filtered signal.

The third filtered signal is fed to a first subtraction unit 911 which generates a first difference signal between the third filtered signal and the first input signal $u_1$ (delayed by a delay 913). The fourth filtered signal is fed to a second subtraction unit 915 which generates a second difference signal between the fourth filtered signal and the second input signal $u_2$ (delayed by a delay 917).

In the system, the filter coefficients of the adaptive filters 907, 909 are adapted in the presence of a dominant signal from the desired sound source such that the difference signals $x_1$, $x_2$ are reduced and specifically minimized. A suitable algorithm for doing so is the well known Normalized Least Mean Squares algorithm. Periodically, for example after each data block of N samples, the time reversed filter coefficients 907 are copied to the filter 901 and the time reversed coefficients 909 are copied to the filter 903. By doing so, the power of the output signal z in the presence of a dominant signal from the desired sound source is maximized by the beam forming unit 900.

In the frequency domain, the transfer function of the third adaptive filter 907 corresponds to a complex conjugate of a transfer function of the first adaptive filter 901 and the transfer function of the fourth adaptive filter 909 corresponds to a complex conjugate of a transfer function of the second adaptive filter 903.

In more detail, the operation of the beam forming unit 900 may be described with reference to a signal model which use frequency domain quantities that are the Fourier transforms of continuous time signals. It is assumed that each of the microphone signals contains a signal component from a desired source component, a reverberant signal component, and noise.

According to the model, the vector of microphone signals $u(\omega)=[u_1(\omega) u_2(\omega)]^t$ (where the superscript t denotes transposition) is given by $$u(\omega)=h(\omega)s(\omega)+d(\omega)+n(\omega)$$

where $s(\bullet)$ is the desired source signal, $h(\bullet)$ is the vector of acoustic impulse responses from the source to the microphones including the direct sound path and possibly some early reflections, $d(\bullet)$ is reverberation, and $n(\bullet)$ is uncorrelated noise having equal variance on each of the microphones. Assuming that the desired signal, reverberation and noise are mutually uncorrelated, the input cross-power spectral density is given by $$P_{uu}(\omega) = E\{u(\omega)u^h(\omega)\} = \sigma_s^2(\omega)h^*(\omega)h^t(\omega) + \sigma_d^2(\omega)P_{dd}(\omega) + \sigma_n^2(\omega)I(\omega)$$

where $\sigma_s^2(\omega)$, $\sigma_d^2(\omega)$ and $\sigma_n^2(\omega)$ are the variances of the source signal, reverberation, and noise, respectively, $I(\bullet)$ is the identity matrix, the superscript h denotes complex conjugate transposition and * denotes complex conjugation.

The reverberation is modeled as a diffuse (spherically isotropic) sound field. Although this is a simplified theoretical model, it has been proven to be a valuable model in many applications and is useful to provide an insight into the operation and performance of the algorithm used in the beam forming unit 900.

For omni-directional microphones, the coherence matrix of the reverberation is given by $$P_{dd}(\omega) = \begin{Bmatrix} 1 & \frac{\sin\omega d/c}{\omega d/c} \\ \frac{\sin\omega d/c}{\omega d/c} & 1 \end{Bmatrix}$$

where d is the distance between the microphones and c is the speed of sound.

Using the described signal model, the combined directional output signal z of the beam forming unit 900 is given by a filter and sum operation on the microphone signals:

$$z(\omega)=f^t(\omega)u(\omega)$$

In the time domain the filter coefficients for the first and second adaptive filters 901, 903 are specifically time reversed copies of the filter coefficients of the third and fourth adaptive filters 907, 909 respectively. Thus, in the frequency domain the filter coefficients for the first and second adaptive filters 901, 903 are complex conjugated versions of the filter coefficients of the third and fourth adaptive filters 907, 909 respectively. Generally, a delay will be introduced in order to ensure causality of the signal processing and accordingly the third and fourth adaptive filters 907, 909 are in the example phase compensated to take this delay into account. Also, the input signals $u_1$, $u_2$ are delayed in the delays 913, 917 prior to the generation of the difference signals. The delay • of the delays 913, 917 are generally set equal to the length of the adaptive filters 901, 903, 907, 909.

It can be shown that the adaptive beam forming unit 900 of FIG. 9 maximizes the power of the combined directional output signal z under the constraint that the summed power of the filter transfer functions equals unity for all frequencies, which can be expressed mathematically as $|f(\omega)|^2=1 \forall \omega$.

Thus, by setting the filter coefficients to minimize the difference signals $x_1$, $x_2$, the power of the combined directional output signal z is maximized thereby providing an adaptation of the audio beam towards the dominant audio signal.

Using the signal model and applying the constraint, the combined directional output signal z is given by:

$$P_z(\omega) = E\{f^h(\omega)P_{uu}(\omega)f(\omega)\} =$$
$$\sigma_s^2(\omega)|f^t(\omega)h(\omega)|^2 + \sigma_d^2(\omega)f^h(\omega)P_{dd}(\omega)f(\omega) + \sigma_n^2(\omega)$$

For the desired source alone (i.e. in the absence of reverberation and noise), the optimal coefficients are given by:

$$f_{opt}(\omega) = \alpha(\omega)\frac{h^*(\omega)}{|h(\omega)|}$$

where $\alpha(\omega)$ is an arbitrary all-pass term.

This expression shows that the optimal filter coefficients are equal to the conjugated transfer functions of the desired source to each of the microphones, (disregarding a common unknown amplitude and phase factor). Due to the limited filter length of practical filters, the beam forming unit will in practice only estimate the first part of the time domain impulse responses (typically the part including the direct field and possibly some early reflections).

Accordingly, the filter coefficients provide a highly advantageous estimate of the acoustic transfer functions and in the specific example the first acoustic transfer function is accordingly determined as having the impulse response corresponding to the filter coefficients of the first adaptive filter 901 and the second acoustic transfer function is accordingly determined as having the impulse response corresponding to the filter coefficients of the second adaptive filter 903. Thus, the correlation function is advantageously determined as the correlation between the filter coefficients of the first adaptive filter 901 and the second adaptive filter 903.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of estimating a sound source location for a sound source by particle filtering, the method comprising:
    iterating the step of generating a set of particles for a time instant, the set of particles representing a probability density function for a state variable comprising the sound source location at the time instant; the step comprising for each particle of the set of particles:
    generating a state value for the particle at the time instant in response to a state value of the particle at a previous time instant, and
    generating a weight for the particle at the time instant in response to (i) a weight of the particle at the previous time instant and (ii) a measurement at the time instant reflecting the sound source location; and
    generating a state variable estimate comprising a sound source location estimate for a first time instant in response to a combination of state values for the set of particles at the first time instant, the contribution from each particle of the set of particles depending on the weight of the particle, wherein
    generating the weight for the particle at the time instant comprises determining the weight in response to a correlation between estimated acoustic transfer functions that represent relative variations in acoustic paths from the sound source to at least two sound recording positions for the first time instant, wherein the correlation is determined via a correlation function that includes how well the acoustic transfer functions match for a given relative delay offset, further wherein a correlation value for a given delay is perceived as an indication of a likelihood that a path difference between paths from the at least two sound recording positions to the sound source corresponds to that relative delay offset.

2. The method of claim 1, wherein generating the weight further comprises:
    determining the weight for the particle in response to a value of the correlation for a delay corresponding to the state value of the particle.

3. The method of claim 2, wherein the weight has a deterministic relationship to the value of the correlation.

4. The method of claim 3, wherein the deterministic relationship is non-linear.

5. The method of claim 1, wherein generating the weight further comprises using the correlation as an indication of a pseudo likelihood function for a weight update function relating the weight for the particle at the time instant in response to the weight of the particle at the previous time instant.

6. The method of claim 1, wherein the sound source position is represented by a two dimensional position in a two dimensional plane.

7. The method of claim 6, further comprising:
receiving at least one image from a camera covering an environment including the sound source; and
wherein the two dimensional position is a position in the at least one image.

8. The method of claim 7, wherein generating the weight further comprises generating a first weight contribution in response to an image domain measurement for the particle, and generating a second weight contribution in response to the correlation, and generating the weight as a combination of the first weight and the second weight.

9. The method of claim 8, further comprising:
generating a confidence indication for the first weight contribution in response to the correlation; and
adjusting the contribution of the first weight contribution in the combination relative to the second weight contribution in response to the confidence indication.

10. The method of claim 1, further comprising performing an audio beamforming towards the sound source position and estimating the transfer functions in response to the audio beamforming.

11. The method of claim 1, wherein generating the weight further comprises determining the weight in response to a second correlation between estimated acoustic transfer functions from the sound source to one of the at least two sound recording positions and an estimated acoustic transfer function from the sound source to another sound recording position for the first time instant, the another sound recording position being offset relative to a line between the at least two sound recording positions.

12. The method of claim 1, wherein generating the weight further comprises:
receiving a first signal from a sound recording element at a first position of the at least two sound recording positions;
receiving a second signal from a sound recording element at a second position of the at least two sound recording positions; and
estimating the acoustic transfer functions in response to the first signal and the second signal.

13. The method of claim 1, wherein generating the weight further comprises:
filtering the first signal in a first adaptive filter to generate a first filtered signal;
filtering the second signal in a second adaptive filter to generate a second filtered signal;
summing the first and second filtered signal to generate a combined directional signal; and
setting coefficients of the first adaptive filter and the second adaptive filter to generate the combined directional signal such that a power estimate for the sound source component of the combined directional signal is maximized; and
estimating the acoustic transfer functions in response to the coefficients of (i) the first adaptive filter and (ii) the second adaptive filter.

14. The method of claim 13, wherein generating the weight further comprises:
filtering the combined directional signal in a third adaptive filter to generate a third filtered signal, a transfer function of the third adaptive filter corresponding to a delay compensated substantially complex conjugated transfer function of the first adaptive filter;
determining a difference signal between the first signal and the third filtered signal; and
adapting the transfer function of the first adaptive filter to reduce the difference signal.

15. An apparatus for estimating a sound source location for a sound source by particle filtering, the apparatus comprising:
means for iterating the step of generating a set of particles for a time instant, the set of particles representing a probability density function for a state variable comprising the sound source location at the time instant; the step comprising for each particle of the set of particles:
generating a state value for the particle at the time instant in response to a state value of the particle at a previous time instant, and
generating a weight for the particle at the time instant in response to (i) a weight of the particle at the previous time instant and (ii) a measurement at the time instant reflecting the sound source location;
and means for generating a state variable estimate comprising a sound source location estimate for a first time instant in response to a combination of state values for the set of particles at the first time instant, wherein
generating the weight for the particle at the time instant comprises determining the weight in response to a correlation between estimated acoustic transfer functions that represent relative variations in acoustic paths from the sound source to at least two sound recording positions for the first time instant, wherein the correlation is determined via a correlation function that includes how well the acoustic transfer functions match for a given relative delay offset, further wherein a correlation value for a given delay is perceived as an indication of a likelihood that a path difference between paths from the at least two sound recording positions to the sound source corresponds to that relative offset.

* * * * *